United States Patent Office 3,539,635
Patented Nov. 10, 1970

3,539,635
1-n-DODECYLSULFINYL-2-HYDROXY-3-METHYL SULFINYLPROPANE
Hill M. Priestley, North Bergen, N.J., assignor to Lever Brothers Company, New York, N.Y., a corporation of Maine
No Drawing. Filed June 26, 1967, Ser. No. 649,001
Int. Cl. C07c *147/14, 149/18;* C11d *3/65*
U.S. Cl. 260—607
1 Claim

ABSTRACT OF THE DISCLOSURE 1,3-sulfur - substituted - 2 - hydroxypropane compounds which are 1-n-dodecylmercapto-2-hydroxy-3 - methylmercaptopropane and 1-n-dodecylsulfinyl-2-hydroxy-3-methylslufinylpropane. The hydroxylated 1,3-disulfide compound is useful as an intermediate in the preparation of the hydroxylated 1,3-disulfoxide compound which is useful as a suds booster for detergent formulations, a detergent, a lime-soap dispersant and a surface active agent in dentifrice compositions.

---

The present invention relates to novel 1,3-sulfur-substituted-2-hydroxypropane compounds having the following general structural formula:

$$C_{12}H_{25}-\underset{(O)_x}{\overset{\|}{S}}-CH_2-\underset{OH}{\overset{|}{C}H}-CH_2-\underset{(O)_x}{\overset{\|}{S}}-CH_3$$

where both X are either 0 or 1. When both X are 0, the compound is a hydroxylated 1,3-disulfide, namely, 1-n-dodecylmercapto-2-hydroxy - 3 - methylmercaptopropane, and when both X are 1, the compound is a hydroxylated 1,3-disulfoxide, namely, 1-n-dodecylsulfinyl-2-hydroxy-3-methylsulfinyl propane.

The hydroxylated 1,3-disulfide may be prepared by first reacting dodecylmercaptan with epichlorohydrin to form 1 - n - dodecylmercapto-2-hydroxy-3-chloropropane in accordance with the following equation:

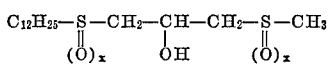

$$C_{12}H_{25}-S-CH_2-\underset{OH}{\overset{|}{C}H}-CH_2-Cl$$

The 1-n-dodecylmercapto-2-hydroxy-3-chloropropane may then be reacted with sodium methyl mercaptide to form 1-n-dodecylmercapto-2-hydroxy - 3 - methylmercaptopropane plus sodium chloride as a by-product in accordance with the following equation:

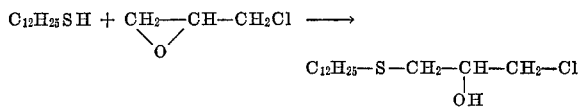

This novel hydroxylated 1,3-disulfide is useful as an intermediate in the preparation of the novel hydroxylated 1,3-disulfoxide. Thus, the 1-n-dodecylmercapto-2-hydroxy-3-methylmercaptopropane may be oxidized with an oxidizing agent, such as hydrogen peroxide or nitric acid, to yield 1 - n-dodecylsulfinyl-2-hydroxy-3-methylsulfinylpropane in accordance with the following equation:

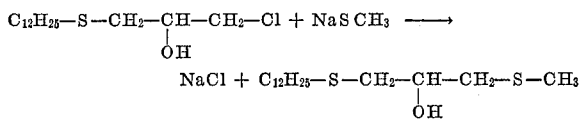

The 1-n-dodecylsulfinyl-2-hydroxy-3-methylsulfinylpropane is useful as a suds booster for detergent formulations, a detergent, a lime-soap dispersant, and a surface active agent in dentifrice compositions.

The following example illustrates the preparation of the hydroxylated 1,3-disulfide and the hydroxylated 1,3-disulfoxide compounds of the invention:

EXAMPLE 1

Preparation of 1-n-dodecylmercapto-2-hydroxy-3-chloropropane 101 gm. of dodecylmercaptan and 51 gm. of epichlorohydrin were allowed to react for several days at 50–60° C. in a closed container until the solution had turned yellow and viscous and a small portion thereof titrated with 0.1 N iodine solution showed the absence of free mercaptan. The product was subjected to vacuum fractional distillation. At a bath temperature of 260° C., the substance distilled at 200° C. at 5 mm. pressure. The yield was 106 gm. The forerun amounted to 14 gm.

Preparation of 1-n-dodecylmercapto-2-hydroxy-3-methylmercaptopropane

To a solution of 3.0 gm. of sodium in 100 ml. of 95% 3A ethyl alcohol there was added 10 ml. of condensed methylmercaptan (to form sodium methyl mercaptide in situ) and 29.4 gm. of the 1-n-dodecylmercapto-2-hydroxy-3-chloropropane prepared above. In the cold, no sodium chloride by-product separated out. The mixture was refluxed for two hours. At the end of this period, the precipitation of the sodium chloride by-product was complete. Water was added, and the oil was extracted with 150 ml. of ether. The ether solution was washed with water, dried with sodium sulfate, and the ether evaporated. After a forerun of 3.1 gm., the main fraction, 20.8 gm., distilled at 197–200° C. at 2.5 mm. pressure (bath temperature of 250–260° C.).

Preparation of 1-n-dodecylsulfinyl-2-hydroxy-3-methylsulfinylpropane (a) A mixture of 2.1 gm. of the 1-n-dodecylmercapto-2-hydroxy-3-methylmercaptopropane prepared above, 12 ml. of acetone, and 2.0 ml. of 30% hydrogen peroxide was kept at room temperature for 72 hours. A precipitate had formed by the end of this period. This was filtered, washed with acetone, and dried. A suspension thereof in water foamed profusely, which property differentiated this hydroxylated 1,3-disulfoxide and the disulfone. The yield of product was 1.3 gm. and it had a melting point of 122° C. It was recrystallized from 15 ml. of 95% 3A ethyl alcohol and washed with 5 ml. of the same solvent. The yield of 1-n-dodecylsulfinyl-2-hydroxy-3-methylsulfinylpropane was 1.05 gm. and it had a melting point of 125° C.

The chemical identity of this hydroxylated 1,3-disulfoxide product was further established by its infrared spectroscopic curve which had a broad peak at 9.5–9.8 micron wavelength indicating the presence of disulfoxide moieties and a further narrow peak at 3 micron wavelength indicating the presence of a hydroxyl group.

(b) In an alternate procedure, 1 gm. of the 1-n-dodecylmercapto-2-hydroxy - 3 - methylmercaptopropane prepared above was added dropwise to 5 ml. of concentrated nitric acid. This was then treated with ice, and the product extracted with 50 ml. of chloroform. The extract was washed with water, dried, and the chloroform removed by evaporation. The residue was triturated with 25 ml. of n-hexane. The yield of product was 0.45 gm. and it had a melting point of about 115° C. The solid was recrystallized from 5 ml. of 3A absolute ethyl alcohol, giving 0.22 gm. of 1-n-dodecylsulfinyl-2-hydroxy-3-methylsulfinylpropane having a melting point of 124° C.

The hydroxylated 1,3-disulfoxide prepared by this alternative oxidation procedure also has the same infrared curve as that for the product prepared above using hydrogen peroxide as the oxidizing agent.

The suds boosting property of the hydroxylated 1,3-disulfoxide of the invention was determined by the following test procedure:

TERG-O-TOMETER SUDS TEST

The Terg-O-Tometer suds test involves empirical measurement of the amount of foam produced under simulated fabric washing conditions. The ratings given in this test are as follows:

TERG-O-TOMETER RATINGS

0—No bubbles
+—Trace
½—Trace to 25% of surface coverage
1—25% to 50% surface coverage
1½—50% to 100% surface coverage
2—Complete surface coverage Stated sizes of cloth are placed in a miniature washing machine and are laundered in the presence of a measured amount of a standard soil preparation and water of a standard hardness. Twelve pieces of cloth 6½″ x 4¼″ nd 1.75 gm. of vacuum cleaner soil are placed in 1 liter of water having a hardness of 50 p.p.m. and a temperature of 120° F. A weight of 1.3 gm. of the product to be tested is added, and the paddles operated for 10 minutes at a rate of 90 complete cycles over a 320° arc per minute.

The following three detergent products were tested by the above described Terg-O-Tometer suds test:

| Product | Parts by weight | | |
|---|---|---|---|
| | A | B | C |
| Sodium dodecylbenzene sulfonate | 18.00 | 18.00 | 18.00 |
| Sodium toluene sulfonate | 2.00 | 2.00 | 2.00 |
| Sodium silicate | 6.00 | 6.00 | 6.00 |
| Pentasodium tripolyphosphate | 15.00 | 15.00 | 15.00 |
| Tetrasodium pyrophosphate | 25.00 | 25.00 | 25.00 |
| Sodium carboxymethyl cellulose | .50 | .50 | .50 |
| Water | 7.00 | 7.00 | 7.00 |
| Miscellaneous ingredients | 2.00 | 2.00 | 2.00 |
| Sodium sulfate | 20.95 | 20.95 | 20.95 |
| Optical brighteners | .03 | .03 | .03 |
| 2-mercaptothiazoline | 0.02 | 0.02 | 0.02 |
| Lauric isopropanolamide | | 3.5 | |
| 1-n-dodecylsufinyl-2-hydroxy-3-methylsulfinyl-propane | | | 3.5 |
| Total | 96.5 | 100.0 | 100.0 |

The Terg-O-Tometer ratings for the above three products were as follows:

| Product: | Terg-O-Tometer rating |
|---|---|
| A | 0 |
| B | ½ |
| C | 1 |

It will be noted from the above comparative test data that Product A was a control detergent formulation which did not contain any suds booster and hence had a low Terg-O-Tometer rating of 0. Product B was the same as Product A except there had been added thereto 3.5 parts of lauric isopropanol amide which is a well known suds booster. The Terg-O-Tometer rating for this comparative Product B was greater than that for control Product A, namely, a rating of ½. On the other hand, Product C was the same as Product A except there had been added thereto 3.5 parts of the hydroxylated 1,3-disulfoxide of the invention, namely, 1-n-dodecylsulfinyl-2-hydroxy-3-methylsulfinylpropane. The Terg-O-Tometer suds rating for Product C was appreciably greater than that for either control Product A or for comparative Product B, i.e., it had a higher rating of 1.

Other standard test procedures establish that the hydroxylated 1,3-disulfoxide of the invention also has utility as a detergent, a lime-soap dispersant and a surface active agent in dentifrice composiitons.

What is claimed is:
1. 1-n-dodecylsulfinyl - 2 - hydroxy-3-methylsulfinyl-propane.

References Cited

UNITED STATES PATENTS 2,787,595  4/1957  Webb _____ 252—138

OTHER REFERENCES

Nicholson et al.: "Chem. Abstracts," vol. 49 (1955), p. 9492–93.

CHARLES B. PARKER, Primary Examiner

D. R. PHILLIPS, Assistant Examiner

U.S. Cl. X.R.

260—609; 252—161; 424—49

PO-1050
(5/69)

UNITED STATES PATENT OFFICE
CERTIFICATE OF CORRECTION

Patent No. 3,539,635   Dated   Nov. 10, 1970

Inventor(s)   Hill M. Priestley

It is certified that error appears in the above-identified patent and that said Letters Patent are hereby corrected as shown below:

Column 1, line 16, "slufinylpropane" should be -- sulfinylpropane --. Column 2, line 46, after the word "1,3-disulfoxide" insert -- compound from the above hydroxylated 1,3-disulfide --.

SIGNED AND
SEALED
FEB 2 1971

(SEAL)
Attest:

Edward M. Fletcher, Jr.
Attesting Officer

WILLIAM E. SCHUYLER, JR.
Commissioner of Patents